F. McFADDEN.
DEMOUNTABLE SOLID TIRE CONSTRUCTION.
APPLICATION FILED JULY 16, 1921.
1,411,922.
Patented Apr. 4, 1922.
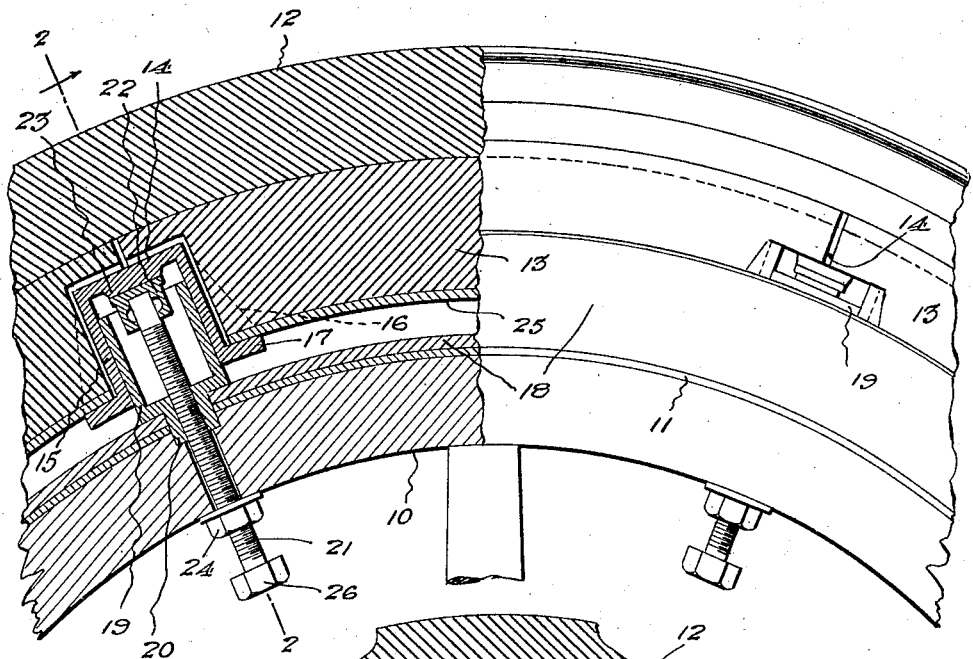
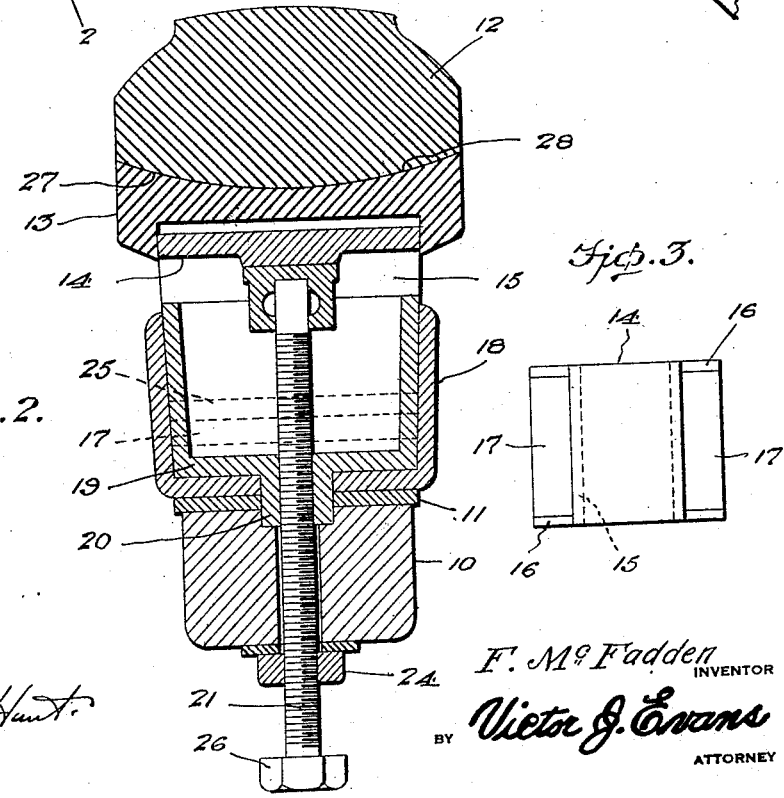
F. McFadden INVENTOR
BY Victor J. Evans ATTORNEY
WITNESS:
Paul W. Hunt

UNITED STATES PATENT OFFICE.

FRANCIS McFADDEN, OF BALTIMORE, MARYLAND.

DEMOUNTABLE SOLID-TIRE CONSTRUCTION.

1,411,922.  Specification of Letters Patent.  Patented Apr. 4, 1922.

Application filed July 16, 1921. Serial No. 485,235.

*To all whom it may concern:*

Be it known that I, FRANCIS McFADDEN, a citizen of the United States, residing at Baltimore, in the county of Baltimore City and State of Maryland, have invented new and useful Improvements in Demountable Solid-Tire Constructions, of which the following is a specification.

This invention relates to improvements in vehicle tires and has for an object the provision of means for removably securing a solid tire upon a vehicle wheel, whereby the tire may be easily and quickly removed or replaced, or adjustment effected from time to time, when necessary.

Another object is the provision of a resilient tire of this character, wherein a separate tread member is provided, the construction being such as to permit of the ready removal and substitution of the said tread member, should the latter become worn or otherwise useless.

With the above and other objects in view, the invention further includes the following novel features and details of construction, to be hereinafter more fully described, illustrated in the accompanying drawings and pointed out in the appended claims.

In the drawings:—

Figure 1 is a fragmentary sectional elevation of a portion of a vehicle wheel and tire, constructed in accordance with the invention.

Figure 2 is an enlarged section on the line 2—2 of Figure 1.

Figure 3 is a plan view of one of the coupling members which connect the sections of the inner retaining member of the tire.

Referring in detail to the drawings, wherein like characters of reference denote corresponding parts, the reference character 10 indicates the felly of a vehicle wheel which may or may not be provided with a metallic band 11.

The invention comprises a solid tire which is preferably formed of rubber or other compressible material and includes an outer annular tread member 12 and an inner sectional retaining member, the latter being preferably formed of separate sections 13 and may also be made of rubber or other compressible material.

The inner retaining member 13 may be formed of any desired number of sections, for example 8 and these sections have their adjacent ends bridged by coupling members 14. The latter are preferably formed of metal and are substantially U-shaped in elevation to provide opposed parallel walls 15, from which extend parallel flanges 16. These flanges are connected at one end by means of transversely arranged flanges 17 so as to provide seats for the reception of the ends of the inner sectional retaining members 13. The coupling member 14 has its side faces open and provides also a substantially channel-shaped member and these coupling members and the inner retaining members 13 are received within an annular transversely channel-shaped guide 18 which is secured to the felly 10 of the wheel. The sections 13 of the inner retaining member and the coupling members 14 which connect said sections are thus permitted to be moved radially of the wheel, but are held against lateral movement.

Receivable within each of the coupling members 14 is a radial guide 19. This guide is preferably rectangular in cross section and is hollow, as shown. The inner end of the radial guide 19 is provided with an extension 20 which projects through an opening provided in the bottom of the channel-shaped guide 18. The extension 20 is provided with a threaded bore for the passage of and engagement by a threaded bolt 21, the latter extending through the radial guide 19 and having rotatably mounted thereon a hub 22, which contacts with a boss or lug 23 provided upon the inside of the coupling 14. Mounted upon the bolt 21 is a clamping nut 24, which serves to hold the radial guide in position within the channel-shaped guide 18 and to hold the latter upon the felly 10.

It is preferred to provide each section 13 of the retaining member with a metallic liner 25 whose ends are received within the seats formed upon the coupling members 14, while the opposite ends of the sections 13 of the inner retaining member, are shaped so as to enter these seats and to extend over the outer ends of the said coupling members, as clearly illustrated in Figure 1 of the drawings. The bolt 21 is provided with a head 26, whereby the bolt may be adjusted, after which the clamping nut may be positioned to prevent accidental movement.

In order to provide a positive engagement between the outer member 12 of the tire and the inner retaining member, the former is provided with a convexed inner surface 27, while the latter is provided with a concaved seat 28. As illustrated in Figure 2, it will be seen that by moving the adjusting screws 21 inwardly, the inner retaining member, or the sections 13 thereof, will be permitted an inward radial movement so as to reduce the diameter of the said retaining member and permit of the removal of the outer annular tread member. By adjusting the nuts in a reverse direction, or outward, the outer annular member may be firmly seated within the concaved seat 28 of the inner retaining member so that the former will be firmly and securely held in position. By this structure, the outer annular tread member, which is subjected to wear may be easily and quickly removed and a new tread member substituted when necessary. At the same time, a tire constructed as above specified, provides a maximum amount of resiliency, due to the compressible nature of its material and the manner in which the ends of the sections of the inner retaining members are suspended upon the seats of the coupling members. The metallic lining 25 may be dispensed with if desired and the resiliency of the tire increased.

In the operation of the invention, the adjacent ends of the sections 13, rest upon seats formed by the flanges 16 and 17 of the members 15, so that when the screws 21 are forced outward, the sections 13 will also be forced outward and the outer circumference of the ring formed by these sections will be increased and will bear against the inner periphery of the tire 12. Due to the transverse shape of the tire 12 and the sections 13, the former will be held against lateral movement, after the said sections have been adjusted. By reversing the direction of rotation of the screws 21, so that the members 15 will move inward, the sections 13 will be disengaged from the tire 12, due to the inward movement of these sections, whereupon the tire may be removed.

The invention is susceptible of various changes in its form, proportions and minor details of construction and the right is herein reserved to make such changes as properly fall within the scope of the appended claims.

Having described the invention what is claimed is:—

1. A vehicle tire embodying an outer tread member, an inner retaining member, means whereby the last named member may be radially adjusted and transversely convexed and concaved engaging surfaces for the adjacent faces of the outer and inner members respectively, whereby the former may be removably secured to the latter.

2. A vehicle tire embodying an outer annular tread member, an inner sectional retaining member, means located between the sections of the retaining member for receiving the adjacent ends of said sections, means whereby the retaining member receiving means may be radially adjusted and means whereby the outer tread member may be removably secured to the inner retaining member by the radial adjustment of the retaining member receiving means.

3. A vehicle tire embodying an outer annular tread member, an inner sectional retaining member, substantially U-shaped coupling members located between the adjacent ends of the sections of the retaining member, oppositely located seats provided upon the coupling members for receiving said adjacent ends, means whereby the coupling members may be radially adjusted and means whereby the outer tread member may be removably secured to the inner retaining member by the radial adjustment of the coupling members.

4. A vehicle tire embodying an annular tread member, an inner sectional retaining member, means located between the sections of the retaining member for receiving the adjacent ends of said sections, radially extending elements spaced around the wheel for slidingly receiving the retaining member receiving means, means extending through the radially extending elements and engageable with said retaining member receiving means, whereby the latter may be radially adjusted and means whereby the outer tread member may be removably secured to the inner retaining member through the adjustment of the retaining member receiving means.

5. A vehicle tire embodying an outer tread member, an inner retaining member, means whereby the last named member may be radially adjusted, means whereby the outer tread member may be removably secured to the inner retaining member by the radial adjustment of the latter and an annular transversely channel-shaped guide member for receiving the inner retaining member adjusting means.

6. A vehicle tire embodying an outer annular tread member, an inner sectional retaining member, a metallic lining for each section of the inner retaining member, means located between the sections of the retaining member for receiving the adjacent ends of said sections and their linings, means whereby the retaining member receiving means may be radially adjusted and means whereby the outer tread member may be removably secured to the inner retaining member by the radial adjustment of the retaining member receiving means.

In testimony whereof I affix my signature.

FRANCIS McFADDEN.